(No Model.)
J. NEUMANN.
ALE PUMP LEVER.
No. 303,037. Patented Aug. 5, 1884.
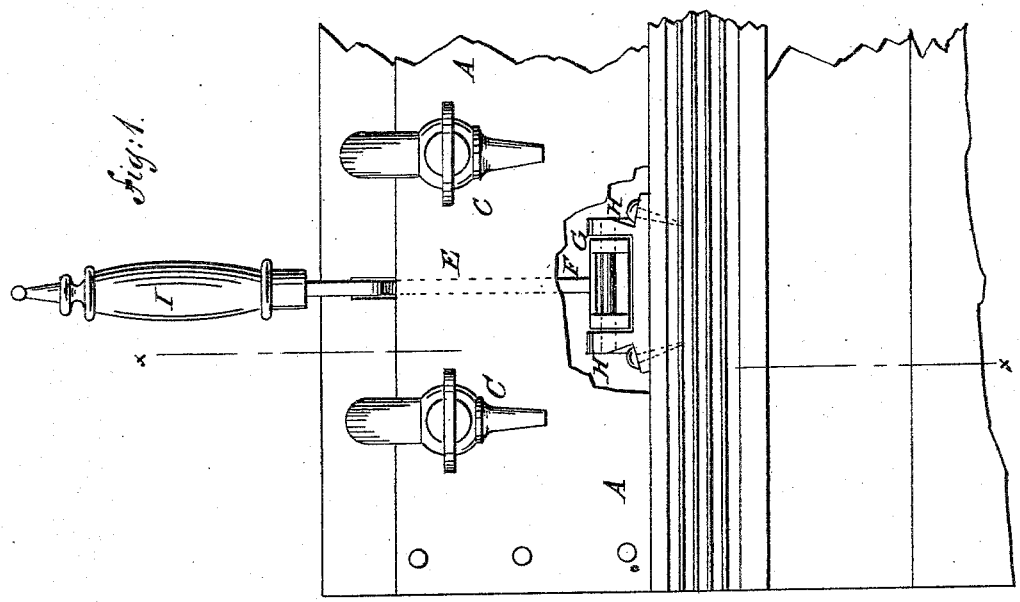
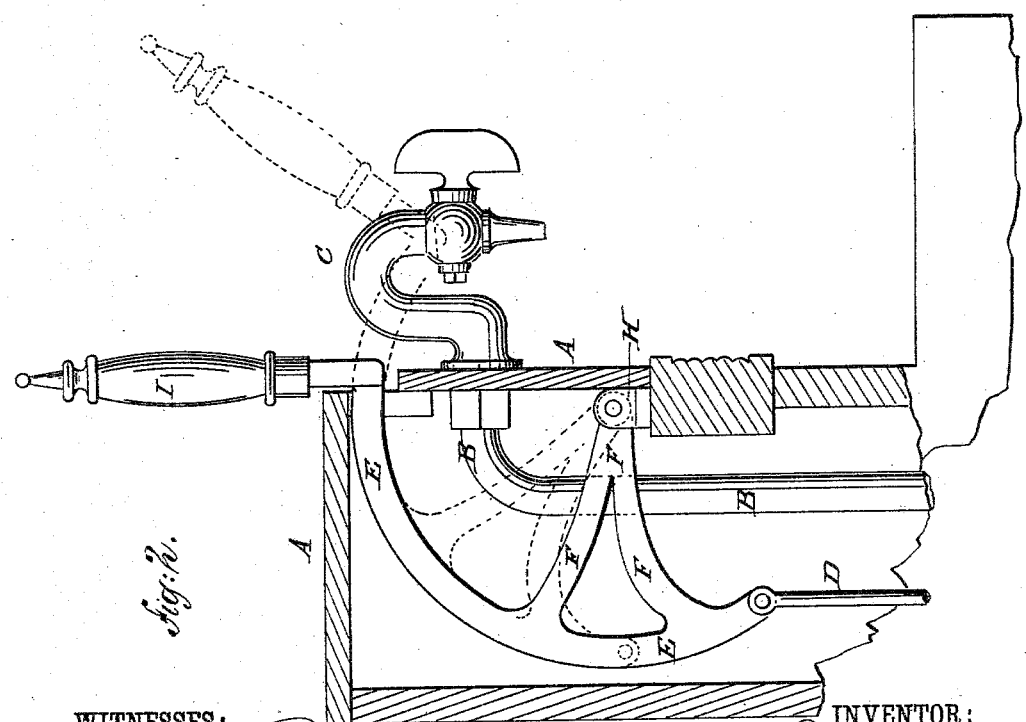
WITNESSES:
Chas. Nida
C. Sedgwick
INVENTOR:
J. Neumann
BY
ATTORNEYS.

UNITED STATES PATENT OFFICE.

JOHN NEUMANN, OF NEW YORK, N. Y.

ALE-PUMP LEVER.

SPECIFICATION forming part of Letters Patent No. 303,037, dated August 5, 1884.

Application filed December 15, 1883. (No model.)

*To all whom it may concern:*

Be it known that I, JOHN NEUMANN, of the city, county, and State of New York, have invented a new and useful Improvement in Ale-Pump Levers, of which the following is a full, clear, and exact description.

Reference is to be had to the accompanying drawings, forming a part of this specification, in which similar letters of reference indicate corresponding parts in both the figures.

Figure 1 is a front elevation of my improvement, part of the casing being broken away. Fig. 2 is a side elevation of the same, the casing being shown in section through the line $x$ $x$, Fig. 1.

The object of this invention is to promote convenience in drawing ale, beer, or other liquid through pumps.

The invention consists in an ale-pump lever made of an arc of a circle having an inwardly-projecting radial fulcrum-arm near its inner end, and an outwardly-projecting radial handle at its outer end, the said arc being connected at its inner end with the piston-rod of the pump, and having its outer end projecting through a hole in the pump-casing, as will be hereinafter fully described.

A represents the casing that covers and supports the discharge-pipes B, and to which are attached the faucets C, connected with the said discharge-pipes B.

D is the piston-rod of the pump, which rod is pivoted at its upper end to the inner end of the pump-lever. The pump-lever is made in the form of an arc, E, of a circle, with a forked radius, F, near its inner end. Upon the end of the radius F, at the center of the circle of which the lever forms a part, is formed a cross-head, G, which is pivoted to a bearing, H, attached to the casing A or other support, so that the lever E F will always move in the same plane.

Upon the outer end of the arc E is formed an outwardly-projecting or radial handle, I. The long arm of the arc E passes through a hole in the casing A, and is made of such a length that radial fulcrum-arm F will remain within the said casing A during the entire stroke of the lever.

I am aware that, broadly, it is not new to effect the connection of the handle with the piston-rod by a bell-crank or analogous contrivance wherein either the handle or the bell-crank connection is required to move upward, in addition, to describe a movement in an arc, or the case, where the bell-crank has such movement, is required to be elevated, which obvious inconvenience, because requiring a corresponding movement of the hand, is obviated by my invention, the only movement necessary in the manipulation of the handle of the latter being in one direction—downward—whereby the handle is continuously lowered or brought nearer to the operator.

Having thus described my invention, I claim as new and desire to secure by Letters Patent—

1. The lever E, having the handle I at one end and the rigid fulcrum-arm F near the other end, said fulcrum-arm forming a radius of the circle of which the lever is an arc, the extreme lower end of said lever forming a connection for the piston-rod, substantially as and for the purpose set forth.

2. The lever E, of the arc of a circle, and having the handle I at one end, and near the other end the rigid fulcrum-arm F, of a length about equal to the radius of the circle of which the lever E is an arc, in combination with the cross-head G, supported in lugs of a plate, H, said cross-head being formed upon or connected to the free end of said arm, substantially as and for the purpose set forth.

JOHN NEUMANN.

Witnesses:
JAMES T. GRAHAM,
EDGAR TATE.